(12) United States Patent
Nishizawa et al.

(10) Patent No.: US 7,862,881 B2
(45) Date of Patent: Jan. 4, 2011

(54) LABEL FOR IN-MOLD FORMATION

(75) Inventors: Takatoshi Nishizawa, Ibaraki (JP); Hiroshi Koike, Ibaraki (JP)

(73) Assignee: Yupo Corporation, Tokyo (JP)

( * ) Notice: Subject to any disclaimer, the term of this patent is extended or adjusted under 35 U.S.C. 154(b) by 961 days.

(21) Appl. No.: 10/909,291

(22) Filed: Aug. 3, 2004

(65) Prior Publication Data
US 2005/0058831 A1  Mar. 17, 2005

Related U.S. Application Data

(63) Continuation of application No. PCT/JP03/01069, filed on Feb. 3, 2003.

(30) Foreign Application Priority Data
Feb. 4, 2002  (JP)  ............................. 2002-027119

(51) Int. Cl.
*B41M 5/00* (2006.01)
*B44C 1/17* (2006.01)
*G03G 7/00* (2006.01)

(52) U.S. Cl. ...................... 428/195.1; 428/206; 428/323

(58) Field of Classification Search ............... 428/195.1, 428/206, 323
See application file for complete search history.

(56) References Cited

U.S. PATENT DOCUMENTS

| | | | |
|---|---|---|---|
| 6,495,295 B1 * | 12/2002 | Shioda et al. ................... | 430/1 |
| 6,551,671 B1 | 4/2003 | Nishizawa et al. | |
| 6,620,473 B2 | 9/2003 | Nishizawa et al. | |
| 6,764,760 B2 | 7/2004 | Nishizawa et al. | |

(Continued)

FOREIGN PATENT DOCUMENTS

JP  5-46094  2/1993

(Continued)

OTHER PUBLICATIONS

U.S. Appl. No. 10/645,591, filed Aug. 22, 2003, Nishizawa, et al.

(Continued)

*Primary Examiner*—Betelhem Shewareged
(74) *Attorney, Agent, or Firm*—Oblon, Spivak, McClelland, Maier & Neustadt, L.L.P.

(57) ABSTRACT

A label for in-mold formation is provided which can be readily delaminated from the container by any one because of its excellent delamination initiation property and delamination transmission property as well as its low interlaminar strength, and which can be recorded with information such as pictures and letters on the inner side concealed by the label, and therefore, enabling effective utilization of the display area, or utilization of the delaminated label portion as a request form or a discount ticket, so called coupon.

The present invention discloses a label for in-mold formation which includes a base layer (A) containing a thermoplastic resin, a layer (B) which enables delamination, and a heat seal layer (D) in this order; the aforementioned label for in-mold formation which includes an intermediate layer (C) between the layer (B) which enables delamination and the heat seal layer (D); and a resin molded product with a label to which the label for in-mold formation is attached to integrate with such a resin molded product by thermal fusion.

21 Claims, 1 Drawing Sheet

U.S. PATENT DOCUMENTS

| | | |
|---|---|---|
| 2001/0013391 A1 | 8/2001 | Amrine |
| 2002/0061391 A1* | 5/2002 | Hayashi et al. ............ 428/209 |
| 2003/0008082 A1 | 1/2003 | Dronzek, Jr. et al. |
| 2003/0017293 A1 | 1/2003 | Franko, Jr. et al. |
| 2003/0151247 A1 | 8/2003 | Nishizawa et al. |

FOREIGN PATENT DOCUMENTS

| | | |
|---|---|---|
| JP | 5-46095 | 2/1993 |
| JP | 6-019400 | 1/1994 |
| JP | 8-254956 | 10/1996 |
| JP | 10-258476 | 9/1998 |
| JP | 2001-343894 | 12/2001 |
| WO | WO 93/17411 | 9/1993 |

OTHER PUBLICATIONS

U.S. Appl. No. 11/719,702, filed May 18, 2007, Koike, et al.
Derwent Publications, AN 1998-576427 (49), XP-002471171, JP 10-258476 (1998) (corresponds to JP 10-258476).
Derwent Publications, AN 1994-068957 (09), XP-002471210, JP 6-019400 (1994) (corresponds to JP 6-019400).
European Patent Office Communication issued Oct. 12, 2010, in European Patent Application 03 703 148.1, filed Feb. 3, 2002.

* cited by examiner

LABEL FOR IN-MOLD FORMATION

This application is a continuation of International Application PCT/JP03/01069, filed Feb. 3, 2003.

TECHNICAL FIELD

The present invention relates to a label used for in-mold formation in which a resin molded product with a label is produced by previously setting a label to be brought into contact with a wall surface of a die; and blow molding through introducing a melted parison of a thermoplastic resin into a die, or injection molding of a melted thermoplastic resin, or vacuum molding or pressure molding of a melted thermoplastic resin sheet.

BACKGROUND ART

Conventionally, for integrally forming a resin molded container with a label, a blank or a label is previously inserted into a die, and then the container is formed in the die by injection molding, blow molding, differential pressure molding, expansion molding or the like followed by decoration on the container (see, JP-A-58-69015 and Europe Patent Publication No. 254923). Such known labels for in-mold formation include resin films with gravure printing, artificial paper with multiple-colored offset printing (for example, see JP-B-2-7814 and JP-A-2-84319), or aluminum labels produced by laminating high pressure low density polyethylene, ethylene-vinyl acetate copolymer on the rear face of an aluminum foil followed by gravure printing on its front face, and the like which have already been put to practical use.

In recent years, environmental issues are growing into a serious problem as typified by Containers Recycling Law, and thus, so-called material recycle has prevailed in which plastic containers that were conventionally subjected to incineration or land filling are recovered, ground, melted and molded. By using the same material as that of the container or a thermoplastic resin having a melting point approximately that of the material of the container as a material of the label attached to the plastic container, grinding of the container can be performed in the state where the label remains attached, followed by melting and formation.

However, these labels are generally printed on the surface thereof with printing ink, thereby raising problems involved in coloring of the processed product upon melting and forming of the ground container and label. Therefore, easy delamination of the printed label from the container has been strongly desired. In this respect, JP-T-7-507397 (the term "JP-T" as used herein means a published Japanese translation of a PCT patent Application) and JP-A-10-258476 describe a label that can be delaminated; however, it was hardly adequate in terms of delamination initiation property and delamination transmission property.

Moreover, procedures of making multi-layered labels printed on respective front and rear faces, and subjecting them to temporary attachment, have been put to practical use for the purpose of describing more information on less area on the label, in recent years. However, in instances of the in-mold formation, temporary attachment between the multi-layered labels is not resistant to mold shrinkage during the molding, leading to delamination between the labels to result in lifting.

The invention solves these problems in the conventional art, and an object of the invention is to provide a label for in-mold formation which can be readily delaminated from the container by any one on behalf of excellent delamination initiation property and delamination transmission property as well as low interlaminar strength, and which can be recorded with information such as pictures and letters on the inner side concealed by the label, and therefore, enabling effective utilization of the display area, or utilization of the delaminmated label portion as a request form or a discount ticket, so called coupon.

DISCLOSURE OF THE INVENTION

The present inventor elaborately investigated these problems to solve them, and consequently found a label for in-mold formation having the intended properties by laminating thermoplastic resin films having a specific layer constitution. Thus, the present invention was accomplished.

Accordingly, the present invention is a label for in-mold formation which comprises a base layer (A) containing a thermoplastic resin, a layer (B) which enables delamination, and a heat seal layer (D) in this order. In addition, an intermediate layer (C) can be provided between the layer (B) which enables delamination and the heat seal layer (D) depending on the position of display of the information.

The layer (B) which enables delamination is preferably a film stretched in at least one direction comprising 10 to 80% by weight of inorganic fine powder and/or an organic filler, and a thermoplastic resin; interlaminar strength of the layer (B) which enables delamination is preferably 5 to 75 g/cm; and the intermediate layer (C) preferably comprises a thermoplastic resin.

Further, the heat seal layer (D) preferably comprises an ethylene based resin and/or a propylene based resin having a melting point lower than the melting point of the major resin used in the base layer (A) by 5° C. or more, as a principal component; and adhesive restriction is preferably provided on a part of the surface of the heat seal layer (D) for facilitating the delamination initiation property.

Moreover, printing may be executed on any surface of the layer (B) which enables delamination, the intermediate layer (C) and the heat seal layer (D) as needed, and also, the label may be perforated.

Furthermore, curl height of the base layer (A) following delamination at the layer (B) which enables delamination is preferably 30 mm or less after one minute; and the base layer (A) and the layer (B) which enables delamination preferably satisfy the following formula (1).

$$1.5 \leq (E \times t - 50)/P \leq 400 \tag{1}$$

E: Tensile modulus [kg/cm$^2$] of the base layer (A)
t: Wall thickness [cm] of the base layer (A)
P: Interlaminar strength [g/cm] of the layer (B) which enables delamination The invention also includes a resin molded product with a label to which the aforementioned label for in-mold formation is attached.

BRIEF DESCRIPTION OF DRAWINGS

Regarding numerals and signs in the Figures: A1 denotes a base layer; A2 denotes a surface layer; B denotes a layer which enables delamination; C denotes an intermediate layer; and D denotes a heat seal layer. 1 denotes printing ink (information); and 2 denotes adhesive restriction (printing ink).

BEST MODE FOR CARRYING OUT THE INVENTION

Hereinafter, the easily separable laminate film of the present invention is explained in more detail.

The laminated film of the invention comprises a base layer (A), a layer (B) which enables delamination and a heat seal layer (D), as described above, and may be provided with an intermediate layer (C) if necessary. Although printing on the label is usually executed on the side of the base layer (A), adhesive restriction may be provided on a part of the side of the heat seal layer (D) for the purpose of facilitating initiation of the delamination.

Further, printing may be executed on any surface of the layer (B) which enables delamination, the intermediate layer (C) and the heat seal layer (D) as needed, so that information such as pictures and letters appear following delamination of the base layer (A).

[Base Layer (A)]

The base layer (A) comprising a thermoplastic resin, has great strength per se, and is hardly broken per se upon stripping.

The type of the thermoplastic resin for use in the base layer (A) is not particularly limited. For example, a polyolefin based resin such as high density polyethylene, middle density polyethylene, low density polyethylene, a propylene based resin or polymethyl-1-pentene, a polyamide based resin such as nylon-6 or nylon-6,6, a thermoplastic polyester based resin such as polyethylene terephthalate or a copolymer thereof, polybutylene terephthalate, or a fatty acid polyester, polycarbonate, atactic polystyrene, syndiotactic polystyrene or the like may be used. Among these thermoplastic resins, polyolefin based resins which are excellent in processability are preferred.

More specific examples of the polyolefin based resin include single polymers of an olefin such as ethylene, propylene, butylene, butadiene, isoprene, chloroprene and methyl-1-pentene, and copolymers comprising two or more kinds of these olefins.

The thermoplastic resin of the base layer (A) may be one selected from the aforementioned thermoplastic resins for use alone, or for use as a combination through a selection of two or more. Furthermore, a propylene based resin is preferred among these polyolefin based resins in light of chemical resistance, cost and the like. It is desired that the propylene based resin for use includes a copolymer as a principal component obtained by the copolymerization of a propylene single polymer, propylene, which is a propylene single polymer and exhibits isotactism or syndiotactism and any of various stereo regularities, as a principal component, with α-olefin such as ethylene, 1-butene, 1-hexane, 1-heptane or 4-methyl 1-pentene. This copolymer may be binary or ternary or higher, or may be a random copolymer or a block copolymer. It is preferred that the propylene based resin is used after blending a resin having a melting point which is lower than that of the propylene based resin in an amount of 2 to 25% by weight. Illustrative examples of such resin having a lower melting point include high density or low density polyethylene.

The major resin of the base layer (A) is a resin used in the greatest amount, which is preferably a polyolefin based resin, and more preferably a propylene based resin.

To the thermoplastic resin of the base layer (A) may be added inorganic fine powder, an organic filler, a stabilizer, a light stabilizer, a dispersant, a lubricant and the like as needed.

When the inorganic fine powder is added, one having a particle diameter of generally 0.01 to 15 μm, and preferably 0.1 to 5 μm may be used. Specific examples include calcium carbonate, burnt clay, silica, diatomaceous earth, white earth, talc, titanium oxide, barium sulfate, alumina, zeolite, mica, sericite, bentonite, sepiolite, vermiculite, dolomite, wollastonite, glass fiber and the like.

The organic filler is selected from incompatible resins having a higher melting point or glass transition point than that of the aforementioned thermoplastic resin for the purpose of formation of vacancies. Specific examples which may be illustrated include polyethylene terephthalate, polybutylene terephthalate, polyamide, polycarbonate, polyethylene naphthalate, polystyrene, polymers or copolymers of an acrylate ester or a methacrylate ester, melamine resins, polyphenylene sulphite, polyimide, polyether ether ketone, polyphenylene sulfide, single polymers of cyclic olefin and copolymers of cyclic olefin and ethylene (COC), and the like. Among them, when a polyolefin based resin is used as a thermoplastic resin of the base layer (A), any one selected from polyethylene terephthalate, polybutylene terephthalate, polyamide, polycarbonate, polyethylene naphthalate, polystyrene, single polymers of cyclic olefin and copolymers of cyclic olefin and ethylene (COC) and the like is preferred.

The stabilizer can be added usually in the range of 0.001 to 1% by weight. Specifically, a stabilizer which is steric hindering phenol based, phosphorus based, amine based or the like may be used. When the light stabilizer is used, it can be usually used in the range of 0.001 to 1% by weight. Specifically, a light stabilizer which is steric hindering amine or benzotriazole based, benzophenone based or the like can be used. The dispersant or the lubricant is used for the purpose of, for example, dispersing inorganic fine powder. The agent may be usually used in an amount of in the range of 0.01 to 4% by weight. Specifically, a silane coupling agent, a higher fatty acid such as oleic acid or stearic acid, metal soap, polyacrylic acid, polymethacrylic acid or a salt thereof or the like may be used.

Wall thickness of the base layer (A) is in the range of 10 to 50 μm, and preferably 20 to 300 μm. When the wall thickness is less than 10 μm, breaking strength of the base layer (A) becomes so low that breakage occurs during stripping off. Thus, the object of the invention is not achieved. Further, when the wall thickness is greater than 500 μm, stiffness of the label becomes so high that strength of the container part at the label end is decreased upon in-mold formation.

The base layer (A) may be of a bilayered structure, or a multi-layered structure with three or more layers. Alternatively, number of axes of stretch of this multi-layered structure may be uniaxial/uniaxial, uniaxial/biaxial, biaxial/uniaxial, uniaxial/uniaxial/biaxial, uniaxial/biaxial/uniaxial, biaxial/uniaxial/uniaxial, uniaxial/biaxial/biaxial, biaxial/biaxial/uniaxial or biaxial/biaxial/biaxial. By making the base layer (A) to be multi-layered, more favorable writing characteristic, printing characteristic, thermal transfer aptitude, resistance to abrasion, secondary processing aptitude and the like can be achieved.

In order to make the printing characteristics of letters or images favorable, a coating layer may be provided on the surface of the base layer (A). Examples of the coating agent of the same include combinations of a known binder and any of known various pigments as a pigment coat layer suited for offset printing, gravure printing, flexographic printing, screen printing, letterpress printing or the like, or binders suited for each printing ink, and examples of the coat layer for thermal recording include combinations of a known leuco dye and a developer. Examples of the coating layer for ink jet recording include known combinations of a water soluble resin and an emulsion resin, a water absorbing pigment, and a cationic substance as a dye fixer. Examples of the coating layer for thermofusible transfer recording include known combinations of a lipophilic pigment and any of various binder resins, or it may be a receptive layer containing a low melting resin having a melting point of 130° C. or less as a principal component. Examples of the coating layer for sublimatic thermal transfer may be a receptive layer containing a dye fixable resin as a principal component.

More specific examples of the pigment coating agent include those containing 10 to 80% by weight of a pigment such as clay, talc, calcium carbonate, magnesium carbonate, aluminum hydroxide, silica, aluminum silicate, calcium silicate, a plastic pigment, titanium dioxide or white earth powder, which may be used for general coat paper, and 90 to 20% by weight of an adhesive. Moreover, examples of the adhesive used therein include latex such as SBR (styrene-butadiene rubber) and MBR (methacryl-butadiene rubber), acryl based emulsion (aqueous solution containing an acrylate ester resin or the like), starch, PVA (polyvinyl alcohol), CMC (carboxymethyl cellulose), methyl cellulose and the like. Further, into these compounding agents may blended a dispersant such as specialized sodium polycarboxylate, a cross-linking agent such as a polyamide urea based resin, a foam inhibitor, a waterproofing agent, a lubricant, a fluorescent coating material or the like. These pigment coating agents are used as a water soluble coating agent having the solid content of 5 to 90% by weight, and preferably 35 to 65% by weight, in general.

As the means for coating such a coating agent on the aforementioned base material layer, specifically, coating means such as roll coating, blade coating, bar coating, air knife coating, gravure coating, reverse coating, die coating, lip coating, spray coating, comma coating, size press coating, hot melt coating or the like may be adopted.

Amount of coating of the coating layer is 0.1 to 50 g/m$^2$, and preferably 0.1 to 15 g/m$^2$. Wall thickness of the coating layer formed then is 0.1 to 50 μm, preferably 0.1 to 20 μm, and particularly preferably 0.5 to 15 μm.

The coated surface may be subjected to a press smoothing process by a calendar process or the like, as needed. Moreover, the coating may be carried out twice or more times if necessary.

[Layer (B) Which Enables Delamination]

The layer (B) which enables delamination according to the invention is a layer of which strength is less than those of the base layer (A) and the intermediate layer (C). Delamination of the label of the invention is carried out by disruption of the delamination of the layer (B) which enables delamination. Preferred mode of the layer (B) which enables delamination is a thermoplastic resin stretched film containing 10 to 80% by weight, preferably 15 to 70% by weight of inorganic fine powder and/or an organic filler, and 90 to 20% by weight, preferably 85 to 30% by weight of a thermoplastic resin. When the content of the inorganic fine powder and/or organic filler of the layer (B) which enables delamination is less than 10% by weight, sufficient delamination property is not achieved, and when the content is greater than 80% by weight, stability upon formation of the film is impaired. As the thermoplastic resin, any thermoplastic resin presented in the item of the base layer (A) can be used, and similarly to the base layer (A), a polyolefin based resin is preferably used. As the inorganic fine powder and/or organic filler, any one presented in the item of the base layer (A) can be used.

It is preferred that the layer (B) which enables delamination is stretched. Stretch forming results in decreased and uniform thickness, formation of fine vacancies, and reduced strength, therefore, interlaminar strength which is intended by the invention can be achieved.

Thickness of the layer (B) which enables delamination is in the range of 0.1 to 30 μm, and preferably 0.2 to 10 μm. When the thickness is less than 0.1 μm, sufficient delamination property is not achieved. When the thickness is greater than 30 μm, although no problem is found for the delamination property, no uniform delamination face is provided, thereby giving a film having a thickness with unevenness when the stripped film is to be utilized.

Although the surface of the layer (B) which enables delamination is provided with the intermediate layer (C) and the heat seal layer (D), through executing printing prior to providing those layers, appearance of pictures, letters and the like is enabled on the side of the container. A favorable adhesion property of printing ink can be achieved by a corona discharge treatment or the like carried out on the surface of the layer (B) which enables delamination prior to executing the printing.

[Heat Seal Layer (D)]

The resin for use in the heat seal layer (D) according to the invention is selected ad libitum depending on the resin for use in formation of the container by in-mold formation. Melting point of the resin is preferably lower than the melting point of the major resin used in the base layer (A) by 5° C. or more, and more preferably lower by 10° C. to 120° C. Examples of the resin which may be used include ethylene based resins having a melting point of 50 to 140° C. such as low density or middle density high pressure polyethylene having the density of 0.900 to 0.935 g/cm$^3$, linear polyethylene having the density of 0.860 to 0.970 g/cm$^3$, ethylene-vinyl acetate copolymers, ethylene-acrylate copolymers, ethylene-alkyl acrylate ester copolymers of which alkyl group having 1 to 8 carbon atoms, ethylene-alkyl methacrylate ester copolymers of which alkyl group having 1 to 8 carbon atoms and metal salts (Zn, Al, Li, K, Na and the like) of ethylene-methacrylate copolymers and/or propylene based resins having a melting point of 90° C. to 155° C. as typified by propylene-α olefin copolymers. Among them, ethylene based resins are preferred. The heat seal layer (D) can be laminated on the layer (B) or the intermediate layer (C) by sticking the films comprising the resin, or subjecting the resin to direct extrusion lamination or to extrusion lamination followed by stretching.

Furthermore, any of various hot melt adhesions such as vinyl acetate based, polyester based, polyolefin based, styrene-elastomer based and polyamide based resins may be applied, or a vinyl acetate based or polyester based resin dissolved in a solvent may be applied with any of various coaters followed by drying.

To the heat sealing resin of the invention may be optionally added other known additive for resins in the range not to inhibit the intended heat sealing property. Examples of the additive include dyes, core agents, plasticizers, mold releasing agent, antioxidants, flame retardants, ultraviolet ray absorbents and the like.

The thickness of the heat seal layer (D) is in the range of 0.1 to 20 μm, and preferably 0.5 to 10 μm. When the thickness is less than 0.1 µm, enough adhesion force to the container is not achieved, and when the thickness is greater than 20 µm, curling of the film becomes prominent, and thus, problems may be caused in sheet-fed printing or insertion of the label into the die.

Appearance of pictures, letters and the like is enabled on the side of the container through executing the printing on the surface of the heat seal layer (D) in the range not to inhibit the adhesion property of in-mold formation onto the container. Further, the adhesion property of the printing ink can be improved by a corona discharge treatment or the like of the surface of the heat seal layer (D), prior to executing the printing.

[Intermediate Layer (C)]

The intermediate layer (C) according to the invention is a layer that remains on the side of the heat seal layer (D) (the side of the container) through disruption of the layer (B) which enables delamination. Appearance of pictures, letters and the like is enabled on the side of the container through executing printing on the surface of the layer (C) prior to providing the heat seal layer (D).

As the thermoplastic resin that constitutes the intermediate layer (C), any thermoplastic resin presented in the item of the base layer (A) can be used. Similarly to the base layer (A), it is preferred that a polyolefin based resin is used, and a resin having low breaking strength is desired. Specific examples include ethylene based resins and propylene based resins. The intermediate layer (C) is a layer which may or may not contain inorganic fine powder and/or an organic filler. It is preferred that inorganic fine powder and/or an organic filler is not included or included in a small amount because the intermediate layer (C) which is excellent in transparency is obtained, resulting in excellent recognizability of pictures, letters and the like underlying the intermediate layer (C), upon stripping off of the base layer (A).

It is preferred that the intermediate layer (C) is a stretched resin film. According to stretch formation, a thinner intermediate layer (C) having a uniform thickness can be obtained.

The intermediate layer (C) may have a multi-layered structure with a two or more-layered structure. Film thickness of this layer is less than 20 µm, more preferably less than 15 µm, and thus, still more preferably less than 10 µm. When the film thickness is equal to or greater than 20 µm, the intermediate layer (C) is hardly broken, and the delamination is hardly transmitted to the layer (B) which enables delamination. Accordingly, a distance is required to the transmission, thereby yielding an unfavorable appearance post stripping.

Appearance of pictures, letters and the like is enabled on the side of the container through executing printing on the surface of the intermediate layer (C) prior to providing the heat seal layer (D). The adhesion property of the printing ink can be improved by a corona discharge treatment or the like of the surface of the intermediate layer (C), prior to executing the printing.

[Formation of Resin Film]

Method of the formation of the thermoplastic resin film is not particularly limited, but any of known various methods can be used. Specific examples include cast formation in which a melted resin is extruded in the form of a sheet using a single layer or multi-layer T die or I die connected to a screw type extruder; inflation formation in which a melted resin is extruded in the form of a tube using a circular die followed by expansion with internal air pressure; calendar formation in which kneaded materials are flat-rolled with a plurality of heat rolls to process them into the form of a sheet; flat-rolling formation and the like.

[Lamination]

The method of lamination of each layer of the invention is not particularly limited, but any of a variety of known methods can be used. Specific examples include multi-layer die method in which a feed block or a multi manifold is used; extrusion lamination methods in which plurality of dies are used, and the like. In addition, the multi-layer die and the extrusion lamination may be used in combination. Also, any known lamination can be used such as dry lamination or wet lamination in which an adhesive is used; application of a hot melt adhesive or the like.

[Stretching]

Stretching can be performed by any one of a variety of methods which are commonly used.

Temperature of the stretching may be in a known range of the temperature, which is suitable for the thermoplastic resin, equal to or greater than the glass transition point and equal to or less than the melting point of the crystal part of the thermoplastic resin which is predominantly used in the base layer (A). Specifically, when the thermoplastic resin of the base layer (A) is a propylene single polymer (melting point: 155 to 167° C.), the temperature of the stretching should be 100 to 166° C.; and when the thermoplastic resin is high density polyethylene (melting point: 121 to 136° C.), the temperature should be 70 to 135° C., the temperature being lower than the melting point by 1 to 70° C.

Examples of the method of the stretching include, when a cast formed film is stretched, longitudinal stretch utilizing differences in peripheral velocity of the rolls, lateral stretching in which a tenter oven is used, flat-rolling, simultaneous biaxial stretching by a combination of a tenter oven and a linear motor, and the like. In addition, examples of the method of stretching of an inflation film include simultaneous biaxial stretching by a tubular method.

Stretch ratio is not particularly limited, but may be determined ad libitum taking into account of the properties of the thermoplastic resin for use in the base layer (A). For example, when a propylene single polymer or a copolymer of the same is used as the thermoplastic resin, the stretch ratio is about 1.2 to 12 times, and preferably 2 to 10 times in instances of single orientation stretching, while in instances of biaxial stretching, the ratio is 1.5 to 60 times, and preferably 4 to 50 times on the basis of the area scale. When another thermoplastic resin is used, the stretch ratio is 1.2 to 10 times, and preferably 2 to 5 times in instances of single orientation stretching, while in instances of biaxial stretching, the ratio is 1.5 to 20 times, and preferably 4 to 12 times on the basis of the area scale. Furthermore, fine voids formed by the stretching generate light diffusion to elevate the opacity, thereby improving sealing properties of the pictures, letters and the like printed on the surface of the layer (B) or the layer (C).

[Interlaminar Strength]

Interlaminar strength of the layer (B) which enables delamination of the invention is preferably 5 to 75 g/cm, and more preferably 10 to 70 g/cm. When the interlaminar strength is less than 5 g/cm, disadvantages may be present to cause delamination during the secondary processing such as printmaking, printing and sheet cutting. The interlaminar strength being greater than 75 g/cm is not preferred because delamination is not uniformly perfected at the layer which enables delamination, or the label is liable to be cut or cleaved during the delamination.

[Paste Restriction]

The adhesive restriction of the invention is preferably provided on the surface of the heat seal layer (D) for the purpose of suppressing thermal fusion between the heat seal layer and the container material when the in-mold formation of the label is performed, and facilitating initiation of the delamination when the label is delaminated from the container. The adhesive restriction is preferably provided on a part of the end of the label, usually in an area approximate to the extent which allows pinching with fingers. When the area is too small, initiation of the delamination may be difficult, and when the area is too large, the label may be lifted from the container, thereby providing a container with a label having an unfavorable appearance.

The adhesive restriction can be provided by, for example, printing on the surface of the heat seal layer (D). Ink for this printing is not particularly limited, but anyone of offset ink, UV offset ink, gravure ink, silk screen ink, flexographic ink, UV flexographic ink and the like can be used. Also, any of various varnishes can be similarly used.

[Printing]

The printing ink of the invention is not particularly limited, but any one of offset ink, UV offset ink, gravure ink, silk screen ink, flexographic ink, UV flexographic ink and the like can be used. Also, any of various varnishes that may be used for the purpose of protecting the ink can be similarly used.

[Perforation]

The label of the invention may be provided with perforations. A slit portion constituting the perforation preferably has a length of 4 to 10 mm, and an interval between adjacent slit portions is preferably 0.3 to 0.6 mm. The perforation may be provided in either direction of a longitudinal direction or a lateral direction of the label, and also, the number of the perforations can be arbitrarily determined.

[Curl Height]

The curl height according to the invention represents the extent of a curl following delamination of the base layer (A) from the container. When the base layer (A) following delamination is utilized as a request form or a discount ticket, so called coupon, it is preferred that absolute value of the curl height is equal to or less than 30 mm. Curl height following delamination is determined by cutting the delaminated base layer (A) away in a size of 70 mm in width and 90 mm in height, placing on a flat glass plate with the delaminated surface down, leaving it stand for one minute or longer, and thereafter measuring the height of lifting at four corners to give the curl height following delamination with the average value.

When the base layer (A) after leaving it stand for one minute or longer is curled toward the side of the delamination surface, the piece is placed on a flat glass plate with the delaminated surface up, and the measurement of the curl height following delamination is carried out. In this instance, the curl height following delamination is denoted with "−(minus)" attached.

The absolute value of the curl height following delamination of the invention is in the range of preferably equal to or less than 30 mm, more preferably equal to or less than 25 mm, and still preferably equal to or less than 20 mm. When the curl height following delamination is greater than 30 mm, it rolls up when utilized as a coupon or the like, leading to difficulties in reading of the information printed on the coupon.

In order to set the absolute value of the curl height following delamination to be equal to or less than 30 mm, it is preferred that the base layer (A) and the layer (B) which enables delamination satisfy the following formula.

$$1.5 \leq (E \times t - 50)/P \leq 400 \qquad (1)$$

E: Tensile modulus [kg/cm$^2$] of the base layer (A)
t: Wall thickness [cm] of the base layer (A)
P: Interlaminar strength [g/cm] of the layer (B) which enables delamination The value represented by the formula (1) according to the invention is in the range of preferably 1.5 to 400, more preferably 1.6 to 350, and still preferably 1.7 to 300. Tensile modulus of the base layer (A) was determined using a sample delaminated following the in-mold formation, by cutting it into the width of 10 mm, storing in a temperature-controlled room (temperature: 20° C., relative humidity: 65%) for 12 hours, and thereafter measuring with a tensile tester (manufactured by Shimadzu Corporation, AUTOGRAPH) at an extension speed of 2 mm/min, and calculating it from the strain between two points (strain ratio: 0.0005 to 0.0025) and difference in stress there.

[In-Mold Formation]

After setting the label for in-mold formation of the invention on the inner face of the lower female die of a differential pressure molding die such that the printed face of the label is brought into contact with the inner face, the label is fixed on the inner wall of the die by aspiration, and then a melt of the resin sheet of container formation materials is introduced into the top of the lower female die, followed by differential pressure molding according to a conventional method to form a resin molded product with a label, which includes a label integrally fused on the outer wall of the container. Although either vacuum molding or pressure molding may be adopted for the differential pressure molding, both are generally employed in combination, and differential pressure molding in which plug assist is utilized is preferred.

In addition, this label can be particularly suitably used as an in-mold label for blow molding in which a melted resin parison is attached by pressure on the inner wall of a die with pressurized air.

The resin molded product with a label produced in such a manner becomes a container having a favorable appearance decorated by the label, without deformation of the label, with great cohesiveness strength between the container body and the label, and without blister, because the label and the resin container are integrally formed after the label has been fixed within the die.

EXAMPLES

The present invention is explained more specifically below by way of Examples, Comparative Examples and Test Examples.

Materials, amount used, ratio, manipulation means and the like demonstrated below can be modified ad libitum without departing from the spirit of the invention. Accordingly, the scope of the invention is not restricted by specific examples demonstrated below.

Percentage (%) described hereinbelow represents % by weight unless specifically stated.

Example 1

(1) After kneading a composition (A1) including 15% by weight of calcium carbonate having a mean particle diameter of 1.5 μm in a mixture of 80% by weight of a propylene single polymer having a melt flow rate (MFR) of 0.8 g/10 min and 5% by weight of high density polyethylene, and a composition (B) including 45% by weight of calcium carbonate having a mean particle diameter of 1.5 μm in 55% by weight of a propylene single polymer having a melt flow rate (MFR) of 0.8 g/10 min in extruders at a temperature setting of 270° C., respectively, these were fed into one co-extrusion die, and laminated within the die thereby extruding them in the form of a sheet, which was cooled with a cooling apparatus to obtain an unstretched sheet. Next, after heating this unstretched sheet at a temperature of 140° C., it was stretched 4-fold in a longitudinal direction utilizing peripheral velocity of the rolls to obtain a uniaxially stretched sheet.

(2) A composition for the surface layer (A2) including 45% by weight of calcium carbonate having a mean diameter of 1.5 μm mixed in 55% by weight of a propylene single polymer having an MFR of 4 g/10 min was kneaded and extruded in an extruder at a temperature setting of 270° C. to give a sheet, which was laminated on the side of (A1) of the 4-fold stretched sheet which was obtained in the step described in (1) above.

(3) A mixture including 70% by weight of an ethylene 1-hexene copolymer (1-hexene content: 22% by weight, degree of crystallinity: 30, number average molecular weight: 23,000) having an MFR of 18 g/10 min, the density of 0.898 g/cm$^3$ and a melting point of 90° C., which was obtained by copolymerization of ethylene and 1-hexene using a metallocene catalyst, and 30% by weight of high pressure low density polyethylene having an MFR of 4 g/10 min, the density of 0.92 g/cm$^3$ and a melting point of 110° C. were mixed in a tumbler mixer for 3 min. The mixture was extruded from the die in the form of a strand followed by cutting to obtain heat seal layer pellets (D).

(4) The pellets and a composition (C) identically compounded to that in (A2) were melted and kneaded using separate extruders at 250° C., respectively, which were fed into one co-extrusion die, and laminated at 230° C. within the die. Thereafter, the product was laminated on the side of the layer (B) of the sheet obtained in the step described in (2) above such that the layer (D) is positioned outside.

(5) This five-layered film (A2/A1/B/C/D) was introduced into a tenter oven, heated again upto 155° C., and stretched 8-fold in a lateral direction. Following subsequent thermal setting at 160° C., it was cooled to 55° C., and the selvage part was slit. Further, a corona discharge treatment was executed on the side of the surface layer (A2) at 70 W/m$^2$/min. A multi-layered film with a five-layered structure having the density of 0.80 g/cm$^3$ and wall thickness of 100 μm (thickness of each layer: (A2/A1/B/C/D)=15/70/5/5/5 μm) was obtained.

(6) Offset printing was executed on the side of the surface layer (A2) of this film using DAIYA (type II) offset printing machine with oil-based ink (Best SP (trade name), manufactured by T&K TOKA Company). Further, offset printing was executed to print the adhesive restriction on the side of the heat seal layer (D) at one edge of the label (width: 70 mm, length: 90 mm) in the area of 10 mm×10 mm. This was subjected to cutting and perforation processing to obtain a label for in-mold formation.

(7) These labels for in-mold formation were fixed on one of the split molds for blow formation, using an automated label feeding apparatus such that the side of the printed face is brought into contact with the die utilizing vacuum, and thereafter, a parison of high density polyethylene (melting point: 134° C.) was melted and extruded at 200° C. The split mold was then clamped, thereto was supplied pressurized air of 4.2 kg/cm$^2$ into the parison to allow inflation of the parison to get close to the die, thereby making the shape like the container accompanied by fusion with the label for in-mold attachment. Next, after cooling, the die was opened, and a hollow container to which the label was attached was removed.

(8) Thus attached label was stripped from the bottle initiating from the position of the adhesive restriction. Measurement of curl following delamination of this label gave the result of 20 mm.

Further, measurement of tensile modulus gave the result of 16,200 Kg/cm$^2$ in the longitudinal direction, and 26,700 Kg/cm$^2$ in the lateral direction. Parameter according to the formula (1): (E×t−50)/P was (16,200×0.0085−50)/50=1.75 and
(26,700×0.0085−50)/50=3.54, respectively.

[Evaluation]

(1) Delamination Initiation Property

Facility in delamination of the initiation part of the delamination with the adhesive restriction on the side of (D) of the in-mold formed label was evaluated according to the following standards of judgment.

Particularly favorable (⊚): Delamination is readily initiated.

Favorable (○): Delamination can be initiated when a corner of the label is stripped several times with a nail.

Somewhat inferior (Δ): Delamination can be initiated when a corner of the label is stripped approximately ten times with a nail.

Inferior (X): Delamination can not be initiated with a nail.

(2) Delamination Transmission Property

After stripping the initiation part of the delamination with adhesive restriction on the side of (D) of the in-mold formed label, the part was pinched with fingers to strip the entire face of the label. States of the delamination then were observed for transmission from the initiation part of the delamination to the layer (B) which enables delamination, and evaluated according to the following standards of judgment.

Favorable (○): The initiation part of the delamination is readily transmitted to the layer which enables delamination within a distance of less than 10 mm, and the label is completely stripped at the layer which enables delamination.

Somewhat inferior (Δ): A distance of 10 mm or longer is required for transmission from the initiation part of the delamination to the layer which enables delamination, and the appearance of the part for transmission is unfavorable.

Inferior (X): Cut on the way without transmission on the entire face.

Figure 1:
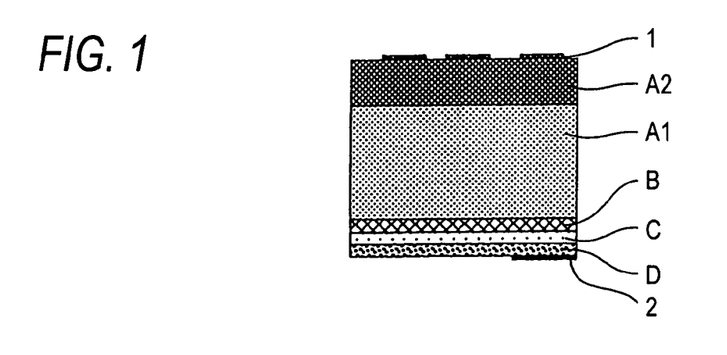
FIG. 1 is a cross sectional view showing the label for in-mold formation according to Example 1 of the present invention.
Figure 2:
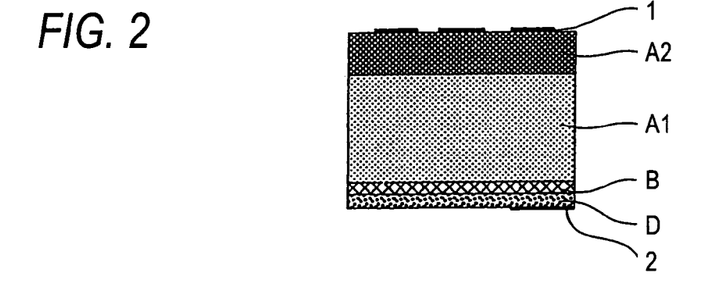
FIG. 2 is a cross sectional view showing the label for in-mold formation according to Example 3 of the invention.
Figure 3:
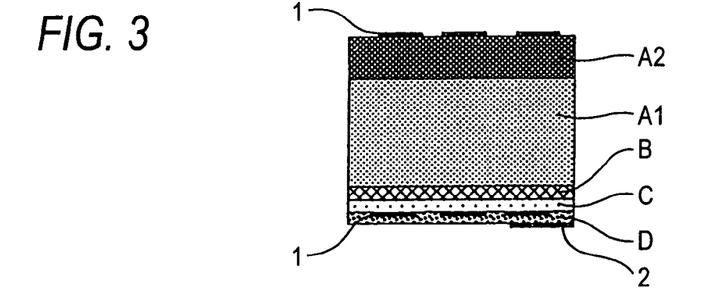
FIG. 3 is a cross sectional view showing the label for in-mold formation according to Example 4 of the invention.
Figure 4:
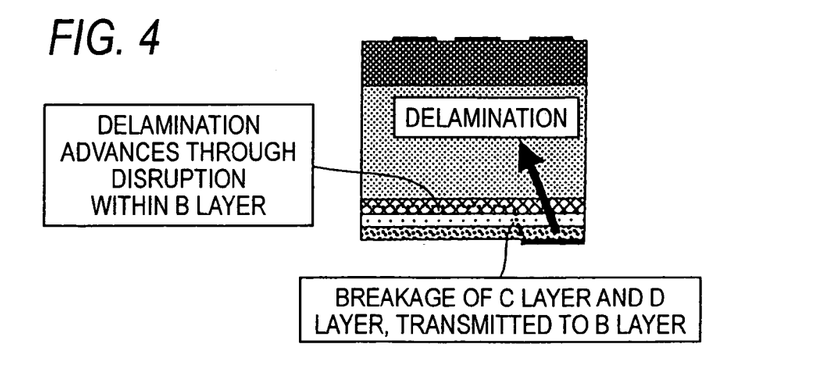
FIG. 4 is a cross sectional view showing the delaminated label for in-mold formation according to Example 1 of the invention.

FIG. 4 illustrates a cross sectional view showing the states of delamination of the label for in-mold formation according to Example 1.

The layer C and the layer D are broken, and the breakage is transmitted to the layer B leading to disruption within the layer B whereby the delamination advances (dashed line in FIG. 4 indicates a broken face).

(3) Interlaminar Strength

After advance of the delamination to the layer which enables delamination in the item (2) above, the label was cut into the width of 10 mm, and the interlaminar strength on the side of the container and the side of the label (interlaminar strength at the layer which enables delamination) was measured using a tensile tester (manufactured by Shimadzu Corporation, AUTOGRAPH) at an extension speed of 300 mm/min and an angle of 180°. The interlaminar strength of the invention is 5 to 75 g/cm, and preferably 10 to 70 g/cm. When the interlaminar strength is less than 5 g/cm, disadvantages may be present to cause delamination during the secondary processing such as print making, printing and sheet cutting. When the interlaminar strength is greater than 75 g/cm, delamination is not uniformly perfected at the layer which enables delamination, or the label is liable to be cut or cleaved during the delamination.

These results of evaluation are presented in Table 1.

(4) Defective Adhesion of Label

Following the aforementioned in-mold blow formation, the label was visually observed as to whether it is lifted without attachment to the container. Evaluation was made as ○ for no lifting, and as X for lifting without adhesion. The results of evaluation are presented in Table 1.

Example 2

Instead of concurrent extrusion of the layer (C) and the layer (D) in Example 1, the layer (C) was extruded alone and laminated. This four-layered film (A2/A1/B/C) was introduced into a tenter oven, heated again upto 155° C., and stretched 8-fold in a lateral direction. Following subsequent thermal setting at 160° C., it was cooled to 55° C., and the selvage part was slit. Further, a corona discharge treatment was executed on both front and rear faces (A2) and (C) at 70 W/m²/min. A multi-layered film with a four-layered structure having the density of 0.78 g/cm³ and wall thickness of 95 μm (thickness of each layer: (A2/A1/B/C)=15/70/5/5 μm) was obtained.

ADD coat 1790(D) (trade name) manufactured by TOYO Morton, LTD. was applied to the side of the layer (C) of this film as a heat seal layer (D) with a bar coater such that the thickness after drying becomes 4 μm, and dried. Except for this step, similar printing, drawing and blow formation was carried out to that in Example 1. Results of evaluation of thus obtained label are presented in Table 1.

Example 3

A picture was printed with an offset printing machine on the side of the layer (C) in Example 2, prior to the coating of the heat seal layer (D). Thereafter, a heat seal layer (D) was provided similarly to Example 2, and similar printing, drawing and blow formation was carried out to that in Example 1. When this label is delaminated from the container, the picture which had been printed between the layer (C) and the layer (D) can be ascertained. Results of evaluation of thus obtained label are presented in Table 1.

Example 4

Instead of the concurrent extrusion of the layer (C) and the layer (D) in Example 1, the layer (D) was extruded alone followed by lamination. This four-layered film (A2/A1/B/D) was introduced into a tenter oven, heated again up to 155° C., and stretched 8-fold in a lateral direction. Following subsequent thermal setting at 160° C., it was cooled to 55° C., and the selvage part was slit. Further, a corona discharge treatment was executed on the side of the front face layer (A2) at 70 W/m²/min. A multi-layered film with a four-layered structure having the density of 0.76 g/cm³ and wall thickness of 95 μm (thickness of each layer: (A2/A1/B/D)=15/70/5/5 μm) was obtained. Thereafter, similar printing, drawing and blow formation was carried out to that in Example 1. Results of evaluation of thus obtained label are presented in Table 1.

Example 5

The three-layered film (A2/A1/B) was introduced into a tenter oven in Example 1 without laminating the layer (C) and the layer (D), then it was heated again upto 155° C., and stretched 8-fold in a lateral direction. Following subsequent thermal setting at 160° C., it was cooled to 55° C., and the selvage part was slit. Further, a corona discharge treatment was executed on both front and rear faces (A2) and (B) at 70 W/m²/min. A multi-layered film with a three-layered structure having the density of 0.74 g/cm³ and wall thickness of 90 μm (thickness of each layer: (A2/A1/B)=15/70/5 μm) was obtained. ADD coat 1790 (D) manufactured by TOYO Morton, LTD. was applied to the side of the layer (C) of this film as a heat seal layer (D) with a bar coater such that the thickness after drying becomes 4 μm, and dried. Thereafter, similar printing, drawing and blow formation was carried out to that in Example 1. Results of evaluation of thus obtained label are presented in Table 1.

Example 6

Prior to the coating of the heat seal layer (D) in Example 5, a picture was printed on the side of the layer (B) with an offset printing machine. Thereafter, a heat seal layer (D) was provided similarly to Example 5, and similar printing, drawing and blow formation was carried out to that in Example 1. When this label was delaminated from the container, the picture which had been printed between the layer (B) and the layer (D) can be ascertained. Results of evaluation of thus obtained label are presented in Table 1.

Example 7

Printing for adhesive restriction on the side of the heat seal layer (D) was not executed in Example 1. Although initiation of delamination was somewhat difficult, initiation of the delamination was possible by delamination after several times with a nail. Results of evaluation of thus obtained label are presented in Table 1.

Example 8

In a similar manner to (1) and (2) in Example 1, a sheet was produced by extruding the layer (A2) on one face of the layer (A1) which was uniaxially stretched. Separately therefrom, the layer (B) which enables delamination prepared by mixing 65% by weight of calcium carbonate having a mean particle diameter of 1.5 μm in 35% by weight of a propylene single polymer having an MFR of 4 g/10 min, the layer (A3) identically compounded to that of the (A2) (constituting a part of the base layer), and pellets for the heat seal layer (D) were kneaded in an extruder set to be 270° C., laminated with one co-extrusion die, and extruded on the side of (A1) of the aforementioned sheet to give a five-layered film (A2/A1/A3/B/D) This film was introduced into a tenter oven, heated again upto 155° C., and stretched 8-fold in a lateral direction. Following subsequent thermal setting at 160° C., it was cooled to 55° C., and the selvage part was silted. Further, a corona discharge treatment was executed on the side of the surface of the layer (A2) at 70 W/m²/min. A multi-layered film with a five-layered structure having the density of 0.79 g/cm³ and wall thickness of 100 μm (thickness of each layer: (A2/A1/A3/B/D)=15/70/5/5/5 μm) was obtained. Except for the changes, similar printing, drawing and blow formation was carried out to that in Example 1. Results of evaluation of thus obtained label are presented in Table 1.

Example 9

A corona discharge treatment was executed on both faces of the surface layer (A2) and the heat seal layer (D) at 70 W/m²/min in Example 1. Offset printing was executed on the side of the surface layer (A2) using DAIYA (type II) offset printing machine with oil-based ink. Thereafter, minor printing of a picture in the vicinity of the center of the rear face (area of the printed part accounting for about 20% in total area of the label), and offset printing at an edge in the area of 10 mm×10 mm for adhesive restriction were further executed. Results of evaluation of thus obtained label are presented in Table 1.

Comparative Example 1

Similar printing, drawing and blow formation was carried out to that in Example 1 except that compounding of the layer (B) which enables delamination in Example 1 was changed to a composition (B) including 5% by weight of calcium carbonate having a mean particle diameter of 1.5 μm in 95% by weight of a propylene single polymer having a melt flow rate (MFR) of 0.8 g/10 min. Although initiation of the delamination was easy on behalf of the printing for adhesive restriction, the delamination was difficult at the layer (B) which enables delamination. Therefore, transmission of the delamination was not smoothly caused, resulting in partial breakage at the base layer (A1). In addition, upon measurement of curl of the label, the height could not be measured due to cylindrical curling.

Parameter according to the formula (1): (E×t−50)/P was (16,200×0.0085−50)/130=0.67 and (26,700×0.0085−50)/130=1.36, respectively. Results of evaluation of thus obtained label are presented in Table 1.

Comparative Example 2

The rotation number of the extruder was adjusted such that the wall thickness of the layer (C) in Example 1 became 25 μm.

Because the layer (C) is hardly broken, the delamination was hardly transmitted to the layer (B) which enables delamination, requiring a distance of 15 to 20 mm to the transmission, thereby resulting in an unfavorable appearance after stripping. Results of evaluation of thus obtained label are presented in Table 1.

Comparative Example 3

Printing of a picture was executed on an almost entire face on the side of the heat seal layer (D) other than the printed part for adhesive restriction at the corner of the label in Example 1. This label did not attach to the container upon the blow formation, and lifting of the label from the container occurred on the almost entire face. Results of evaluation of thus obtained label are presented in Table 1.

Comparative Example 4

In Example 1, compounding of the layer (B) which enables delamination was changed to 100% by weight of a propylene single polymer having a melt flow rate (MFR) of 0.8 g/10 min (B, wall thickness after stretching: 5 μm); the intermediate layer (C) was changed to a mixture of 50% by weight of low density polyethylene having an MFR of 4 g/10 min, the density of 0.92 g/cm³ and a melting point of 110° C., and 50% by weight of high density polyethylene having an MFR of 12.5 g/10 min, the density of 0.960 g/cm³ and a melting point of 134° C. (C, wall thickness after stretching: 20 μm). Delamination in this instance is not the disruption of the (B) layer, but delamination between the layer (B) and the layer (C). Except for the changes, similar printing, drawing and blow formation was carried out similarly to that in Example 1. Although initiation of the delamination is easy on behalf of the printing for adhesive restriction, the layer (C) is hardly broken, therefore, transmission to the delamination between the layer (B) and the layer (C) is difficult, requiring a distance of 15 to 20 mm to the transmission, thereby resulting in unfavorable appearance after stripping.

TABLE 1

| | Layer A | | | Layer B | | | | Layer C | | | |
|---|---|---|---|---|---|---|---|---|---|---|---|
| | Type | Stretching | Wall thickness | Type | Stretching | Wall thickness | Printing | Type | Stretching | Wall thickness | Printing |
| Example 1 | A2/A1 | uniaxial/biaxial | 85 | B | biaxial | 5 | Absent | C | uniaxial | 5 | Absent |
| Example 2 | A2/A1 | uniaxial/biaxial | 85 | B | biaxial | 5 | Absent | C | uniaxial | 5 | Absent |
| Example 3 | A2/A1 | uniaxial/biaxial | 85 | B | biaxial | 5 | Absent | C | uniaxial | 5 | Present |
| Example 4 | A2/A1 | uniaxial/biaxial | 85 | B | biaxial | 5 | Absent | — | — | — | Absent |
| Example 5 | A2/A1 | uniaxial/biaxial | 85 | B | biaxial | 5 | Absent | — | — | — | Absent |
| Example 6 | A2/A1 | uniaxial/biaxiel | 85 | B | biaxial | 5 | Present | — | — | — | Absent |
| Example 7 | A2/A1 | uniaxial/biaxial | 85 | B | biaxial | 5 | Absent | C | uniaxial | 5 | Absent |
| Example 8 | A2/A1/A3 | uniaxial/biaxial/uniaxial | 90 | B | uniaxial | 5 | Absent | — | — | — | Absent |
| Example 9 | A2/A1 | uniaxial/biaxial | 85 | B | biaxial | 5 | Absent | C | uniaxial | 5 | Absent |
| Comparative Example 1 | A2/A1 | uniaxial/biaxial | 85 | B | biaxial | 5 | Absent | C | uniaxial | 5 | Absent |
| Comparative Example 2 | A2/A1 | uniaxial/biaxial | 85 | B | biaxial | 5 | Absent | C | uniaxial | 25 | Absent |
| Comparative Example 3 | A2/A1 | uniaxial/biaxial | 85 | B | biaxial | 5 | Absent | C | uniaxial | 5 | Absent |
| Comparative Example 4 | A2/A1 | uniaxial/biaxial | 85 | B | biaxial | 5 | Absent | C | uniaxial | 20 | Absent |

TABLE 1-continued

|  | Layer D | | | | Adhesive restriction | Delamination initiation property | Delamination transmission property | Interlaminar strength | Defective adhsion of label | (Ext-50)/P | | Curl height (mm) |
| --- | --- | --- | --- | --- | --- | --- | --- | --- | --- | --- | --- | --- |
|  | Type | Stretching | Wall thickness | Printing |  |  |  |  |  | longitudinal | lateral |  |
| Example 1 | D | uniaxial | 5 | Absent | Present | ◎ | ○ | 50 | ○ | 1.75 | 3.54 | 20 |
| Example 2 | D | — | 4 | Absent | Present | ◎ | ○ | 50 | ○ | 1.77 | 3.64 | 18 |
| Example 3 | D | — | 4 | Absent | Present | ◎ | ○ | 50 | ○ | 1.69 | 3.51 | 22 |
| Example 4 | D | uniaxial | 5 | Absent | Present | ◎ | ○ | 30 | ○ | 2.90 | 6.04 | 8 |
| Example 5 | D | — | 4 | Absent | Present | ◎ | ○ | 30 | ○ | 2.78 | 5.90 | 10 |
| Example 6 | D | — | 4 | Absent | Present | ◎ | ○ | 40 | ○ | 2.07 | 4.34 | 14 |
| Example 7 | D | uniaxial | 5 | Absent | Absent | ○ | ○ | 50 | ○ | 1.79 | 3.69 | 19 |
| Example 8 | D | uniaxial | 5 | Absent | Present | ◎ | ○ | 55 | ○ | 1.73 | 3.49 | 22 |
| Example 9 | D | uniaxial | 5 | Present | Present | ◎ | ○ | 50 | ○ | 1.81 | 3.69 | 15 |
| Comparative Example 1 | D | uniaxial | 5 | Absent | Absent | X | X | 130 | ○ | 0.67 | 1.36 | cylindrical |
| Comparative Example 2 | D | uniaxial | 5 | Absent | Present | ◎ | Δ | 50 | ○ | 1.70 | 3.39 | 24 |
| Comparative Example 3 | D | uniaxial | 5 | Absent | Present*1 | Not determined | Not determined | Not determined | X | — | — | — |
| Comparative Example 4 | D | uniaxial | 5 | Absent | Present | ◎ | Δ | 35 | ○ | 2.46 | 5.13 | 12 |

*1: A picture is printed on the entire face

Although the present invention was explained in detail and with reference to particular embodiments, it would be apparent to parsons skilled in the art that various alterations and modifications can be made without departing from the spirit and scope of the invention.

The present application is based on Japanese Patent Application (Patent Application No. 2002-027119) filed on Feb. 4, 2002, which is incorporated herein by reference in its entirety.

INDUSTRIAL APPLICABILITY

According to the present invention, a label for in-mold formation can be provided which can be readily delaminated from a container by any one on behalf of an excellent delamination initiation property and delamination transmission property as well as low interlaminar strength, and which can be recorded with information such as pictures and letters on the inner side concealed by the label, and therefore, enabling effective utilization of the display area, or utilization of the delaminated label portion as a request form or a discount ticket, so called coupon.

The invention claimed is:

1. A label for in-mold formation which is a laminate which comprises a base layer (A) comprising a thermoplastic resin, a layer (B) which enables delamination and which has a strength less than that of base layer (A), and a heat seal layer (D) in this order, wherein curl height of said base layer (A) following delamination at said layer (B) is 30 mm or less after one minute, wherein said layer (B) comprises a film stretched in at least one direction comprising 10 to 80% by weight of inorganic fine powder and/or an organic filler, and a thermoplastic resin, and wherein the interlaminar strength of said layer (B) is 5 to 75 g/cm.

2. The label for in-mold formation according to claim 1 which comprises an intermediate layer (C) between said layer (B) and said heat seal layer (D), wherein layer (B) has a strength less than that of intermediate layer (C).

3. The label for in-mold formation according to claim 1 wherein said heat seal layer (D) comprises an ethylene based resin and/or a propylene based resin having a melting point lower than the melting point of the major resin used in the base layer (A) by 5° C. or more, as a principal component.

4. The label for in-mold formation according to claim 1 or 2 wherein an adhesive restriction for the label is provided on a part of the surface of said heat seal layer (D).

5. The label for in-mold formation according to claim 1 or 2 wherein the surface of said base layer (A) opposite the side of layer (B) comprises a coating layer.

6. The label for in-mold formation according to claim 1 wherein said heat seal layer (D) is provided after executing printing on the surface of said layer (B).

7. The label for in-mold formation according to claim 2 wherein said intermediate layer (C) is provided after executing printing on the surface of said layer (B).

8. The label for in-mold formation according to claim 2 wherein said heat seal layer (D) is provided after executing printing on the surface of said intermediate layer (C).

9. The label for in-mold formation according to claim 1 wherein printing is executed on the surface of said heat seal layer (D) to which layer (B) is laminated.

10. The label for in-mold formation according to claim 1 or 2 wherein only a part of the label can be delaminated as determined by perforations provided to the label.

11. The label for in-mold formation according to claim 1 or 2 wherein the following formula (1) is satisfied;

$$1.5 \leq (E \times t - 50)/P \leq 400 \tag{1}$$

E: Tensile modulus [kg/cm$^2$] of the base layer (A)

t: Wall thickness [cm] of the base layer (A)

P: Interlaminar strength [g/cm] of the layer (B).

12. A resin molded product with a label for in-mold formation according to claim 1 or 2 is attached at heat seal layer (D) to integrate by thermal fusion the label with the resin molded product.

13. The label for in-mold formation according to claim 3 wherein an adhesive restriction for the label is provided on a part of the surface of said heat seal layer (D).

14. The label for in-mold formation according to claim 13 wherein the surface of said base layer (A) opposite the side of layer (B) comprises a coating layer.

15. The label for in-mold formation according to claim 13 wherein printing is present on the surface of said layer (B) to which heat seal layer (D) is laminated.

16. The label for in-mold formation according to claim 2 wherein said heat seal layer (D) comprises an ethylene based resin and/or a propylene based resin having a melting point lower than the melting point of the major resin used in the base layer (A) by 5° C. or more, as a principal component.

17. The label for in-mold formation according to claim 16 wherein an adhesive restriction for the label is provided on a part of the surface of said heat seal layer (D).

18. The label for in-mold formation according to claim 17 wherein printing is present on the surface of said intermediate layer (C) to which said heat seal layer (D) is laminated.

19. The label for in-mold formation according to claim 17 wherein printing is present on the surface of said layer (B) to which intermediate layer (C) is laminated.

20. The label for in-mold formation according to claim 13 wherein only a part of the label can be delaminated as determined by perforations provided to the label.

21. The label for in-mold formation according to claim 2 wherein printing is executed on the surface of said heat seal layer (D) to which intermediate layer (C) is laminated.

* * * * *